(12) United States Patent
Pichard et al.

(10) Patent No.: US 9,162,097 B2
(45) Date of Patent: Oct. 20, 2015

(54) EXTINGUISHER IDENTIFYING METHOD AND EXTINGUISHER IDENTIFYING DEVICE

(75) Inventors: Laurent Pichard, Frichemesnil (FR); Stephane Di Marco, Cergy (FR); Jacques Lewiner, Saint-Cloud (FR)

(73) Assignee: FINSECUR, Nanterre (FR)

( * ) Notice: Subject to any disclaimer, the term of this patent is extended or adjusted under 35 U.S.C. 154(b) by 0 days.

(21) Appl. No.: 14/232,604

(22) PCT Filed: Jul. 24, 2012

(86) PCT No.: PCT/FR2012/000305
§ 371 (c)(1),
(2), (4) Date: Jan. 13, 2014

(87) PCT Pub. No.: WO2013/007901
PCT Pub. Date: Jan. 17, 2013

(65) Prior Publication Data
US 2014/0151071 A1    Jun. 5, 2014

(30) Foreign Application Priority Data

Jul. 12, 2011  (FR) ...................................... 11 02201

(51) Int. Cl.
| | |
|---|---|
| *G08B 1/08* | (2006.01) |
| *A62C 37/50* | (2006.01) |
| *G06Q 10/06* | (2012.01) |
| *G06Q 10/08* | (2012.01) |
| *G08B 29/16* | (2006.01) |
| *A62C 13/76* | (2006.01) |

(52) U.S. Cl.
CPC ................ *A62C 37/50* (2013.01); *G06Q 10/06* (2013.01); *G06Q 10/087* (2013.01); *G08B 1/08* (2013.01); *G08B 29/16* (2013.01); *A62C 13/76* (2013.01)

(58) Field of Classification Search
CPC .......... G08B 1/08; G08B 29/16; A62C 37/50; A62C 13/76; G06Q 10/06; G06Q 10/087
USPC ............ 340/539.1, 539.13, 539.17, 521, 522, 340/540, 568.1, 568.8, 572.1, 321, 326, 340/628, 611, 612, 686.1, 691.1, 693.5; 235/492; 169/30, 60, 61
See application file for complete search history.

(56) References Cited

U.S. PATENT DOCUMENTS

| | | | | |
|---|---|---|---|---|
| 6,124,796 | A * | 9/2000 | Hincher ........................ | 340/628 |
| 8,842,016 | B1* | 9/2014 | Cazanas et al. ............... | 340/611 |
| 2005/0148828 | A1* | 7/2005 | Lindsay ....................... | 600/300 |
| 2006/0149321 | A1 | 7/2006 | Merry et al. | |
| 2009/0243836 | A1 | 10/2009 | McSheffrey | |
| 2009/0314842 | A1* | 12/2009 | Charrin ........................ | 235/492 |
| 2012/0188076 | A1* | 7/2012 | McSheffrey ............. | 340/539.17 |

FOREIGN PATENT DOCUMENTS

| | | |
|---|---|---|
| EP | 1533767 A1 | 5/2005 |
| JP | 2009205481 A | 9/2009 |
| JP | 2009225835 A | 10/2009 |

* cited by examiner

*Primary Examiner* — Anh V La
(74) *Attorney, Agent, or Firm* — Im IP Law PLLC; C. Andrew Im (57) ABSTRACT

An extinguisher identifying device. The device comprises an extinguisher identifying device and an activation device, and a communications module. The extinguisher identifying device reads an identifying element on an extinguisher to obtain identifying data of the extinguisher. The activation device is configured to activate the extinguisher identifying device in response to a predetermined event. The communications module is configured to transmit the extinguisher identifying data to a management device.

20 Claims, 9 Drawing Sheets

EXTINGUISHER IDENTIFYING METHOD AND EXTINGUISHER IDENTIFYING DEVICE

RELATED APPLICATIONS

This application is a §371 application from PCT/FR2012/000305 filed Jul. 24, 2012, which claims priority from French Patent Application No. 1102201 filed Jul. 12, 2011, each of which is herein incorporated by reference in its entirety.

TECHNICAL FIELD OF THE INVENTION

The present invention relates to an extinguisher identifying method and a device making it possible to identify an extinguisher.

BACKGROUND OF THE INVENTION

Extinguishers for extinguishing fires are known. A pressure extinguisher, for example, comprises a tank of extinguishing agent designed to put out the fire, and a pressurized gas cartridge. To use the extinguisher, the user must pierce the cartridge to release the gas in the tank, and then operate a handle of the extinguisher to expel the extinguishing agent.

The extinguishers, which are very important for the safety of goods and people, are positioned in premises at suitable positions. The extinguishers are placed on mounts and, to prevent them being removed for reasons other than those originally intended, they are sometimes attached to the mount by means of a wire, sometimes sealed, which can be broken in cases of real need.

However, and for various reasons, extinguishers can be removed from their mount, which is a serious handicap in terms of safety.

In addition, depending on the nature of the risk to be controlled, these extinguishers can be of various types, for example and in a non-limiting way, they can contain different extinguishing agents such as water, foam, various types of powder, gases such as carbon dioxide, halon, etc. During verification operations, or even in the event of work in the premises, an extinguisher of a given type can be put back incorrectly in a location for which another type of extinguisher was intended. In order to limit this risk, specific mounts have been envisaged in order to prevent a given type of extinguisher from being mechanically received on a mount intended for another type of extinguisher.

Finally, it is desirable, in certain cases, to be able to check the condition of extinguishers in real time. This assumes the installation of an electrical network linked to each extinguisher mount, which is feasible in new premises but very difficult to implement in old premises, taking into account the fact that electrical cables have to be passed to locations where this is sometimes difficult and the very high cost such installations entail.

OBJECT AND SUMMARY OF THE INVENTION

The aim of the invention in at least one embodiment is to overcome drawbacks of the state of the art and to make improvements. For this purpose, a first aspect of the invention proposes an extinguisher identifying device, the device comprising extinguisher identifying means configured to obtain identifying data for an extinguisher from an identifying element on the extinguisher; activation means able to activate the identifying means in response to a predefined event; and communication means able to transmit the extinguisher identifying data to a management device.

According to an embodiment, the device comprises a mount to support an extinguisher, the mount comprising an identifying element for the mount to supply the management device with identifying data for the mount allowing the mount to be identified. According to an embodiment, the identifying means are arranged so as to communicate with the identifying element of the extinguisher via a wireless connection in order to verify an identifying code for the extinguisher.

According to an embodiment, the identifying means comprise a device for identification by RF. According to an embodiment, the identifying means comprise an optical reader and image processing means for processing an image coming from the optical reader.

According to an embodiment, the optical reader comprises a linear network of diodes, a two-dimensional optical sensor, a camera, or a laser.

According to an embodiment, the communication means are able to transmit the identifying data by means of a wireless connection.

According to another embodiment, the communication means are able to transmit the identifying data by means of a "powerline" or other type of wired connection.

According to an embodiment, the activation means are able to activate the identifying means at predefined times. According to an embodiment, the activation means are able to activate the identifying means in response to an interrogation signal from the management device. According to an embodiment, the device also comprises means of detecting the absence of an extinguisher from its operating position. According to an embodiment, the activation means are able to activate the identifying means at predefined times after the means of detecting the absence of an extinguisher have detected the removal of an extinguisher from its mount and said means of detecting the absence of an extinguisher have detected an extinguisher being placed back on the mount.

According to an embodiment, the device also comprises signaling means for signaling said absence of the extinguisher at the location of the extinguisher identifying device.

According to an embodiment, the device also comprises means of detecting the presence of at least one person in the vicinity of the extinguisher identifying device, wherein the signaling means are able to signal a visible or audible alarm when the presence of a person is detected. According to an embodiment, the presence detection means comprise a detector of infrared rays coming from an associated emitter of infrared rays or coming from a person in the vicinity of the extinguisher absence detection device.

According to an embodiment, the device also comprises means for checking the operating condition of the extinguisher identifying device so as to supply information representative of the operating condition to the management device.

According to an embodiment, the operating condition verification means are arranged so as to verify the power status of the extinguisher identifying device.

According to an embodiment, the operating condition verification means are arranged so as to measure a parameter representative of the quantity of power remaining in the power source.

According to an embodiment, the operating condition verification means are arranged so as to verify the condition of the wireless connection with the management device.

According to an embodiment, the operating condition verification means are arranged so as to measure a parameter representative of the reception quality of a predefined radio verification signal coming from said management device.

According to an embodiment, the operating condition verification means are arranged to measure the signal-to-noise ratio or the intensity of the predefined radio verification signal.

According to an embodiment, the operating condition verification means are arranged so as to measure a parameter representative of the quantity of extinguishing agent remaining in the extinguisher.

According to an embodiment, the signaling means are arranged so as to signal an operating fault. According to an embodiment, the device also comprises response means able to detect the reception of an interrogation signal coming from the management device and, in response to the reception of the interrogation signal, to transmit information representative of the operating condition of the identifying device and/or the identifying data to the management device. A second aspect of the invention proposes a management device for a fire security system, comprising: communication means able to be linked via a wireless connection to at least one extinguisher identifying device according to the first aspect of the invention so as to receive extinguisher identifying data; and data processing means making it possible to obtain information about an extinguisher as a function of the extinguisher identifying data received. According to an embodiment, the processing means are arranged so as to obtain information about the nature of the extinguishing agent contained in the extinguisher and/or the location of the extinguisher. According to an embodiment, the management device also comprises a memory for storing information about at least one extinguisher.

According to an embodiment, the data processing means are arranged so as to obtain the data identifying the extinguisher's mount; the data identifying the extinguisher; and so as to verify that the data identifying the extinguisher's mount correspond to the data provided for identifying the extinguisher. A third aspect of the invention proposes an extinguishing device comprising: a tank for containing an extinguishing agent that can extinguish a fire; a trigger for expelling the extinguishing agent from the tank; and an identifying element, which can be read by an extinguisher identifying device according to the first aspect of the invention, for identifying the extinguisher. According to an embodiment, the identifying element is arranged so as to communicate with the extinguisher identifying means via a wireless connection in order to supply an identifying code for the extinguisher. According to an embodiment, the identifying element is arranged so as to supply an identifying code by RF.

According to an embodiment, the identifying element comprises the identifying data in optical form.

According to an embodiment, the identifying element comprises the identifying data in electronic form.

A fourth aspect of the invention proposes a monitoring method for a security system comprising a management device and at least the extinguisher identifying device able to communicate with the management device by means of a wireless connection; the method comprising: a step of activating the identifying device's identifying means; a step of identifying an extinguisher via the identifying means; a step of transmitting identifying data to the management device; and a step of verifying the identifying data.

According to an embodiment, the method also comprises a step of obtaining data identifying the extinguisher mount and a verification step for verifying that the extinguisher identifying data correspond to the mount identifying data. According to an embodiment, the method comprises the transmission of information representative of the operating condition of the extinguisher identifying device to the management device. Embodiments of the present invention make it possible to avoid one or more of the problems mentioned and also to provide a real-time check of the arrangement of extinguishers in the premises to be monitored.

BRIEF DESCRIPTION OF THE DRAWINGS

The invention will be described in greater detail with reference to the following figures.

DETAILED DESCRIPTION OF THE EMBODIMENTS

Figure 1:
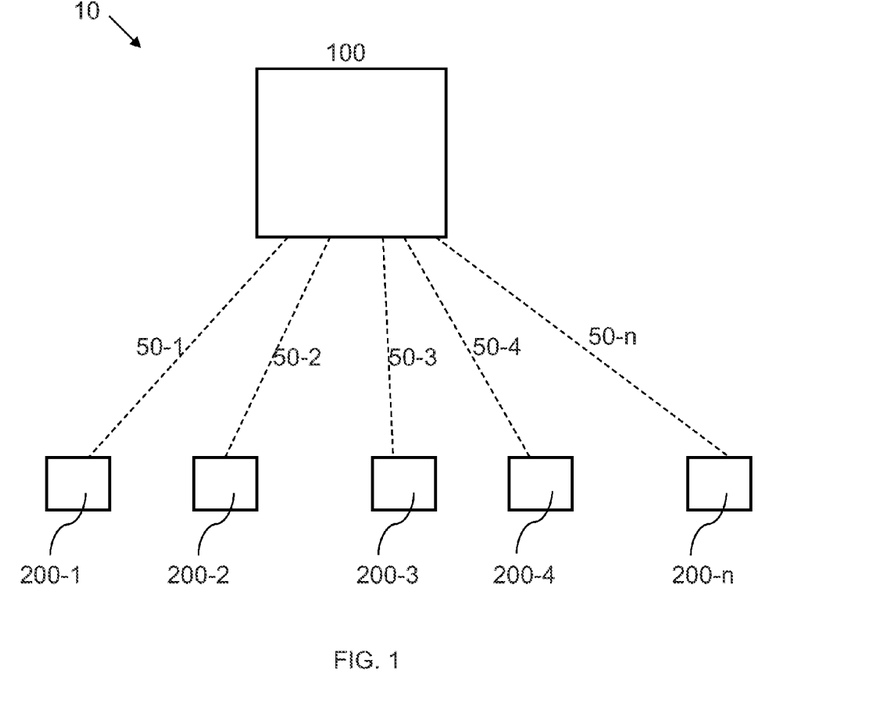
FIG. 1 is a schematic representation of elements of a security system according to at least one embodiment of the invention.

An extinguisher monitoring system 10 according to a first mode of the invention is represented schematically in FIG. 1. This system comprises a central monitoring station 100 connected by means of the wireless connections 50-1 . . . 50-n to extinguisher apparatuses 200-1 . . . 200-n, distributed in an area to be protected.

Figure 2:
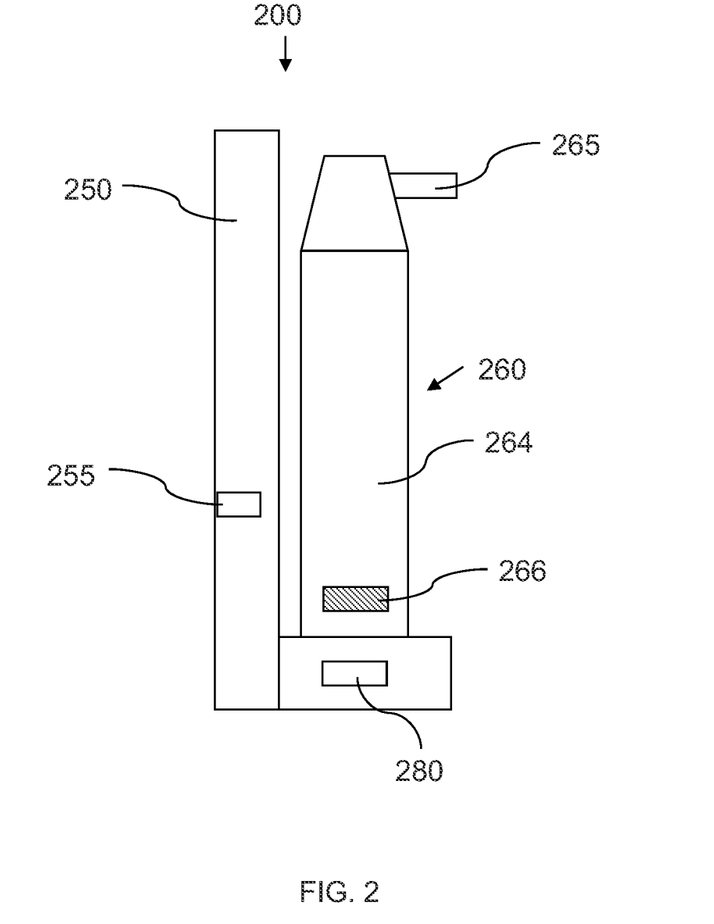
FIG. 2 is a schematic representation of an extinguisher apparatus according to at least one embodiment of the invention.

An extinguisher apparatus 200 according to a first embodiment of the invention is represented schematically in FIG. 2. The extinguisher apparatus comprises an extinguisher mount 250, an extinguisher 260 and an extinguisher identifying device 280. The extinguisher mount 250 is designed in a manner known per se to support a fire extinguisher 260. It comprises an identifying element 255 allowing the extinguisher mount 250 to be identified.

The extinguisher 260 is a pressure extinguisher, which comprises a tank 264 containing an extinguishing agent, which makes it possible to extinguish a fire, and a pressurized gas cartridge. To use the extinguisher, the user must pierce the cartridge to release the gas in the tank 264, and then operate a handle 265 of the extinguisher 260 to expel the extinguishing agent. The extinguishing agent can comprise, for example, water, foam, various types of powder, gases such as carbon dioxide, halon, etc.

The extinguisher is equipped with an identifying element 266 that comprises an identifying code allowing the extinguisher 260 to be identified. The extinguisher identifying device 280 according to a first embodiment of the invention is represented schematically in FIG. 3. It comprises a reading device 281 for reading the identifying code of the identifying element 266 allowing an extinguisher to be identified; an activation circuit 282 for activating the reading device 281, a communications module 283 comprising a wireless interface for linking the identifying device 280 to the central monitoring station 100 of the security system by means of the wireless connection 50; a power supply cell or battery 284 to power the extinguisher identifying device 280.

Figure 3:
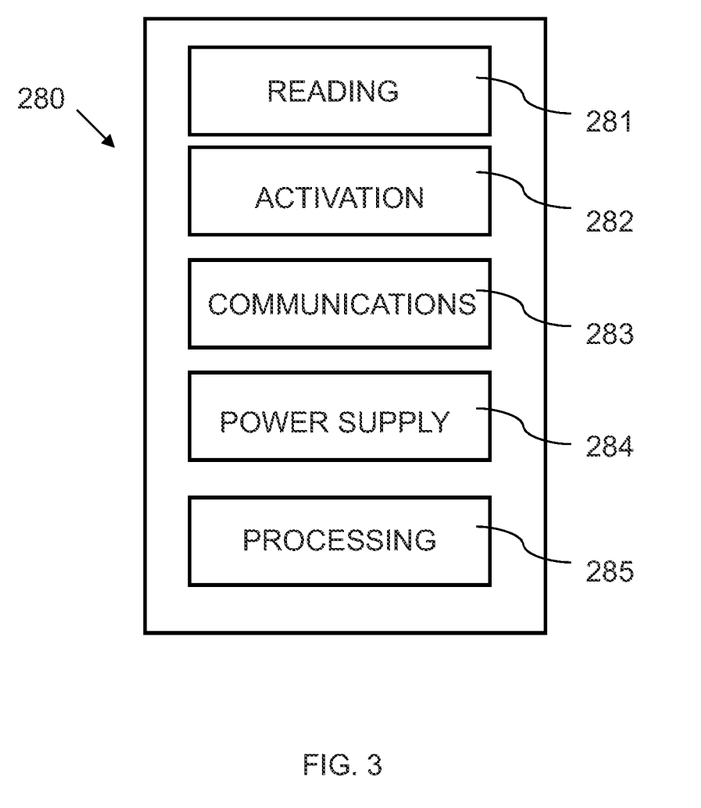
FIG. 3 is a schematic representation of an extinguisher identifying device according to a first embodiment of the invention.

The extinguisher 260 is placed on its extinguisher mount with the extinguisher identifying element 266 positioned facing the reading device 281 of the identifying device 280. At given times, the activation device 282 activates the reading device 281, which then inputs the extinguisher identifying code on the identifying element 266 of the extinguisher 260.

The given times can, for example, correspond to the times of requests, made by the central monitoring station 100, transmitted to the extinguisher apparatuses 200 using radio waves.

The corresponding messages are received by the communications module 283 of the identifying device 280. In response, the activation circuit 282 activates the reading means of the reading device 281, which receives the identifying code of the identifying element 266 of the extinguisher 260 and transmits it to the communications module 283, which retransmits it by radio to the central monitoring station 100.

In a particular embodiment the identifying code 255 of the mount 250 of the extinguisher 260 can be transmitted to the control unit with the extinguisher identifying code 266. In another embodiment the mount 250 can be identified by the control unit 100 by means of the address of the source of the message containing the identifying code of the extinguisher 260.

In another embodiment the times for reading the extinguisher identifying code are preprogrammed. If, according to data received from the reading device 280, it appears that an extinguisher 260-i is missing or that the wrong type of extinguisher 260-i is at a given location on a given mount 250-i, the central monitoring station 100 can then trigger an alarm or transmit this information to a management system.

In another embodiment, the times for reading the extinguisher identifying code are preprogrammed and triggered in response to the removal of an extinguisher from its mount. If it appears that an extinguisher 260-i has not been put back in the intended location or that the wrong type of extinguisher 260-i is at a given location on a given mount 250-i, the central monitoring station 100 can then trigger an alarm or transmit this information to a management system.

The extinguisher identifying element 266 can be of optical type, e.g. a barcode, a two-dimensional code, or even a digital tattooing type of code hidden in a piece of text on the extinguisher 260 such as that known under the name Watermark, or a code associated to an image recognition algorithm. In these cases, the reading device 281 comprises an optical reading device such as a linear array of diodes, a two-dimensional optical sensor, a camera or a laser. These reading devices are equipped with image processing devices in a way known per se.

In another embodiment, the extinguisher identifying element 266 is of electronic type. This can, for example, be realized by an assembly of switches, a matrix of diodes, a semiconductor type of memory, etc. In these cases, the reading device 281 is of electronic type able to examine, for example, the open or closed condition of contacts, the diode matrix, or to read the semiconductor memory. This reading can be done either by using a direct electrical connection between the extinguisher identifying element and the reading means, or by using a radio, inductive or capacitive connection.

A cell or battery 284 is provided for powering the identifying device 280. Hereinafter these two terms will be used interchangeably to denote either a cell or a battery.

In some embodiments, the battery 284 can be arranged so as to power the identifying element 266 of the extinguisher 260. The identifying device 280 according to some embodiments also comprises electronic processing means 285 comprising means of testing the power supply status of the battery 284 and arranged so as to transmit an alarm, using the radio means of the communications module 283, to the central monitoring station 100 when they detect too low a level of residual power in the battery. In a particular embodiment, the electronic processing means 285 are arranged so as to trigger, right at the location of the extinguisher mount, a visual or sound alarm to locally warn of an operational malfunction, e.g. too low a residual power level in the battery.

Figure 4:
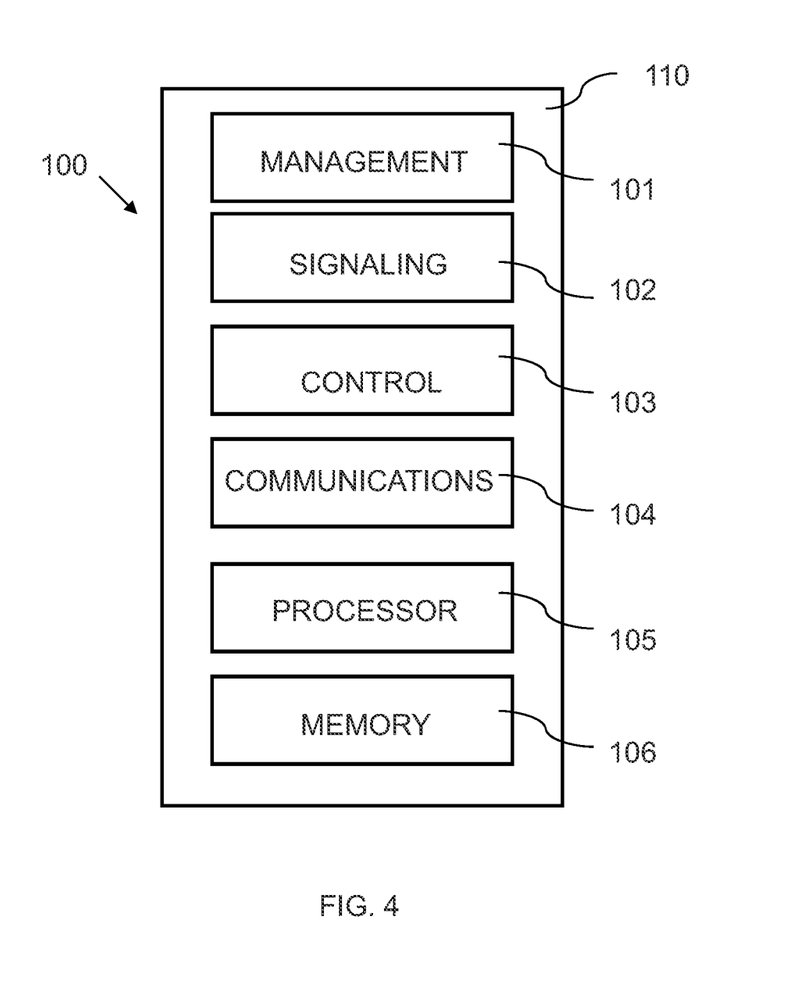
FIG. 4 is a schematic representation of a central monitoring station according to an embodiment of the invention.

In the first embodiment of the central monitoring station illustrated in FIG. 4, the central monitoring station 100 is realized with a single housing 110 that groups together a set of computerized means of management 101, signaling 102, control 103 and communications 104. The central monitoring station 100 also comprises a processor 105 to manage these means and memory 106 to store the data. The central monitoring station 100 is configured to detect the absence of any one of extinguishers 260-1 . . . 260-n, from its operating position 250-1 . . . 250-n and to verify, according to data received from extinguisher apparatuses 200-1 . . . 200-[Pi], that each of the extinguishers 260-1 . . . 260-n is placed at the right location in the area to be protected. The central monitoring station 100 is configured to signal the situation with regard to the location of extinguishers by visual and/or audible means and to control said extinguisher identifying devices 280-1 . . . 280-n. The communication means 104 comprise a wireless interface including a device for receiving and transmitting radio signals, equipped with an antenna to allow the central monitoring station to communicate with the extinguisher identifying devices 280-1 . . . 280-n via wireless connections 50-1 . . . 50-n.

Figure 5:
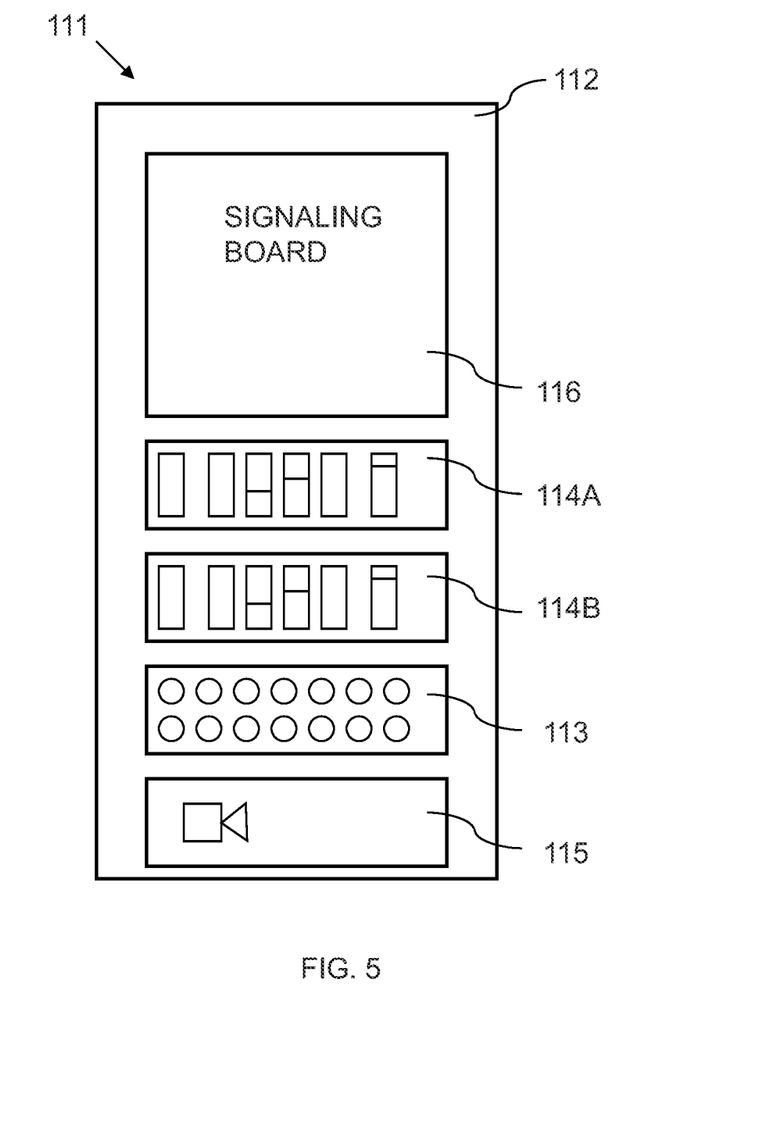
FIG. 5 is a schematic representation of the front face of a central monitoring station housing according to an embodiment of the invention.

FIG. 5 shows the front face 112 of the housing 110 comprising indicators 113, 114A and 114B, which represent the status of the extinguishers of the monitoring system, a sound emitter 115 and a display screen 116. The sound emitter 115 is of a type known, for example, in fire alarms and is designed to emit an audible alarm signal.

The display screen 116 allows the control unit to display visual messages aimed at a user of the central monitoring station and/or at a member of the maintenance team for this device. In particular, the display screen 116 is designed to display an alarm indicator. The housing 110 can be fitted, in a way known per se, with means enabling a connection towards central monitoring and verification means, via a telephone line, the Internet or other means. The central monitoring station 100 is configured to know the identifying code of each extinguisher 260-1 . . . 260-n placed on each mount 250-1 . . . 250-n according to data received from extinguisher apparatuses 200-1 . . . 200-n. By comparing the identifying code of extinguishers 260-1 . . . 260-n and the identifying code of mounts 250-1 . . . 250-n held in a data table in the memory 106, the central monitoring station 100 can verify that all the mounts 250-1 . . . 250-n correctly hold the intended extinguishers 260-1 . . . 260-n.

In an embodiment, the data table contains the identifying codes of all the extinguisher mounts 250-1 . . . 250-n, the corresponding locations of said mounts and the type of extinguisher that must be used in each location.

The data table contains the extinguisher identifying codes of the different extinguishers, the nature of the extinguishers and, where appropriate, the identifying code of the mounts on which they must be placed.

Thus, the central monitoring station 100 can detect the fact that any extinguisher 260-i has been removed from its mount 250-i and has not been put back. It can also check that the extinguishers 260-1 . . . 260-n placed on the mounts 250-1 . . . 250-n are of the type intended at the location of the mount in question. For this, the data table contains not only an identifier of the extinguisher but also its nature (water, foam, various types of powder, gases such as carbon dioxide, halon, etc.) or even the last maintenance inspection date, or other information relating to operations to be carried out, e.g. in the context of regulatory or maintenance procedures. In the same way, the central monitoring station 100 can verify that extinguishers of the correct type are placed at the right location. In a second embodiment of the extinguisher identifying device, shown in FIG. 6, the extinguisher identifying device 380 also comprises a verification device 340 for detecting an operating fault of the extinguisher identifying device 380; and a signaling device 350 able to signal the operating fault in the extinguisher identifying device detected by the verification device 340, at the location of the extinguisher identifying device 380. In another embodiment, an alarm device can be provided in the extinguisher identifying device 380 to generate an alarm signal in case of an operating fault when a test button is operated.

Figure 6:
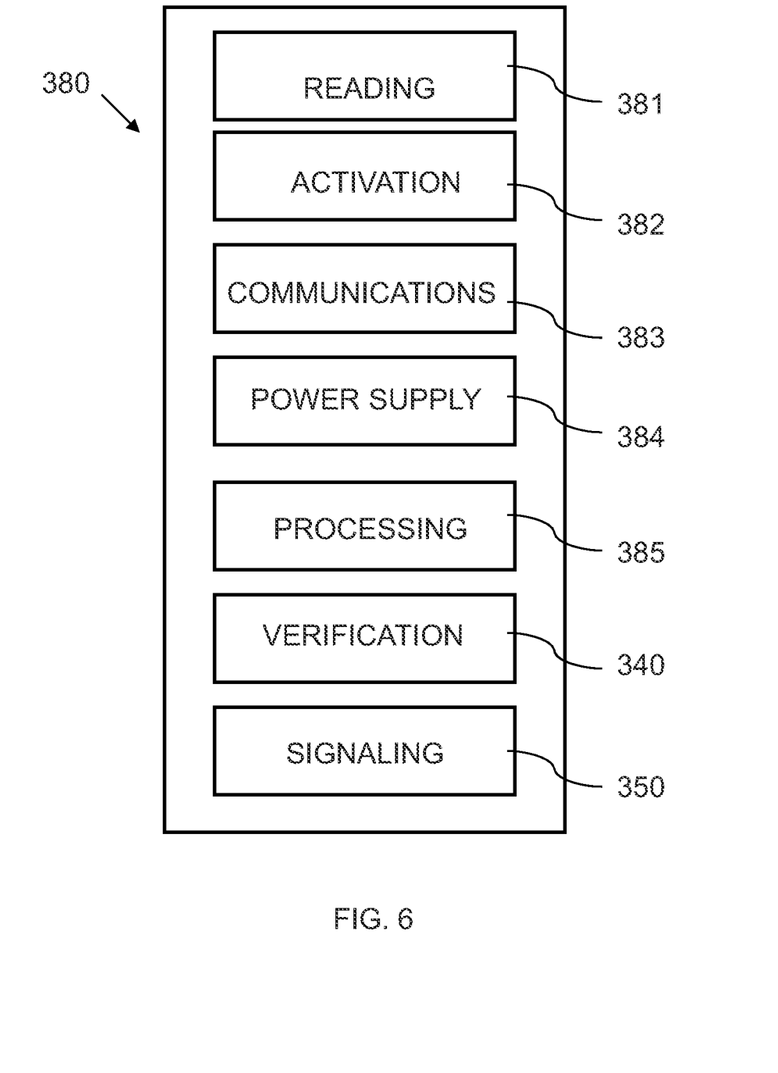
FIG. 6 is a schematic representation of an extinguisher identifying device according to a second embodiment of the invention.

In the embodiment shown in FIG. 6, the verification device 340 is arranged so as to check the quality of the radio communications between the identifying device and the central monitoring station 100. To this end, at predefined times, the radio means of the communications module 330 emit an interrogation message aimed at the central monitoring station 100 and listen to a response signal coming from this central station 100.

If no response is received or in the event of poor-quality radio communications (e.g. a phase, frequency or amplitude modulation presenting too weak a signal-to-noise ratio), a warning message is transmitted to the central monitoring station 100. In addition, a message can be emitted locally in a visual or sound form by means of the signaling device 350. It should be noted that this visual or sound signal can have characteristics that depend on the quality of the radio connection. This can be especially useful during the positioning of extinguisher mounts 260-1 . . . 260-n in the outfitting phase of buildings, for example, the installer can activate the verification means 340 of the radio connection, move about in the area where the extinguisher must be placed and, by observing the sound or light signal, find the location for which the radio communication is optimum. One can, for example, provide for the repetition frequency of the sound pulses to get higher as the quality of the connection improves. In another embodiment, it is the central monitoring station 100 that regularly emits radio interrogation messages towards the different extinguisher mounts 260 and listens to the response signals emitted by the various extinguisher mounts 260-1 . . . 260-n.

In this way, an absence of response or poor quality of the radio connection of one of the mounts can be signaled and transmitted to the management means. In a particular embodiment the verification device 340 can be arranged so as to detect the quantity of extinguishing agent remaining in the tank 264 of the extinguisher 260; thus the signaling means 250 can be configured to signal that the remaining quantity in question is less than a predefined quantity.

Figure 7:
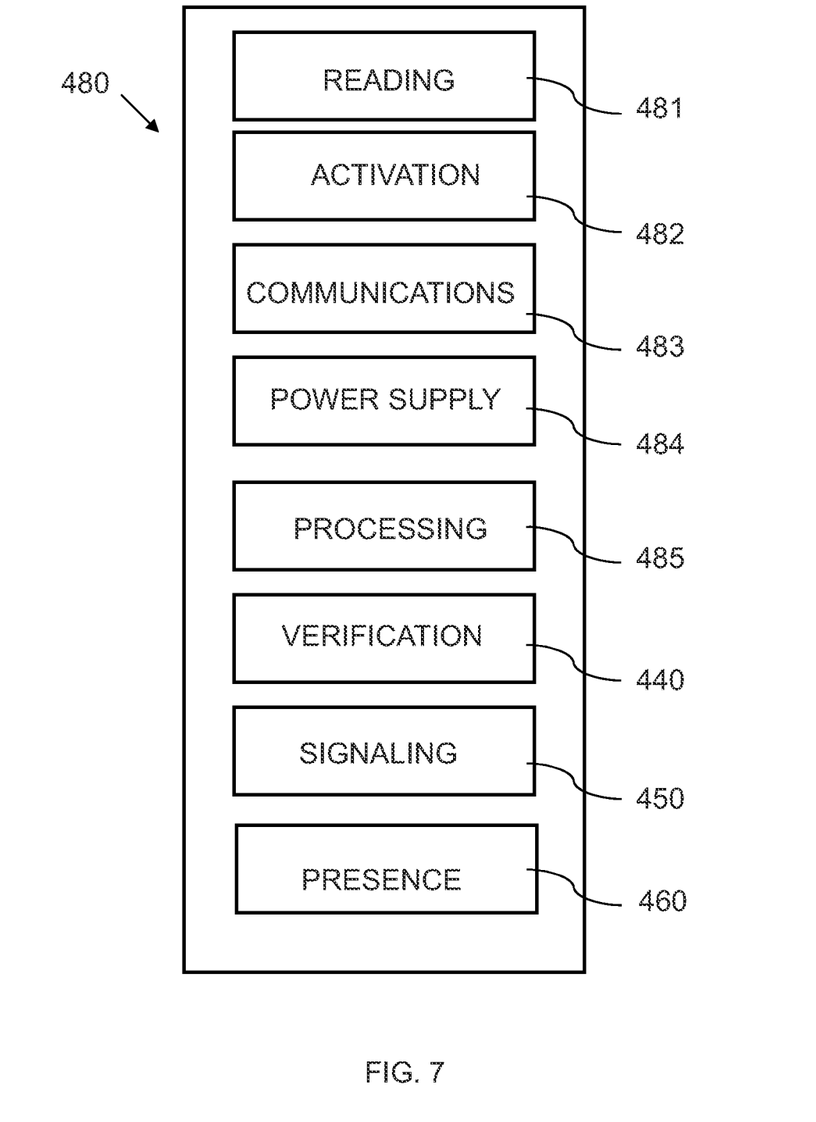
FIG. 7 is a schematic representation of an extinguisher identifying device according to a third embodiment of the invention.

In another embodiment of the invention, shown in FIG. 7, the extinguisher identifying device 480 is equipped with a detector of the presence 460 of at least one person. The presence detector 460 is configured to emit a command signal towards the signaling device 450 so as to only operate the signaling means 450 in the presence of at least one person in the vicinity of the extinguisher identifying device 480. Such a collaboration between the presence detector 460 and the signaling means 450 makes it possible to avoid utilizing signaling means 450 in the absence of a person in its vicinity, which might consume the little power remaining in the power supply battery.

In this embodiment, in a first variant, the detector of the presence of at least one person 460 comprises a detector of infrared rays for detecting the infrared rays coming from an associated emitter of infrared rays. The absence of or reduction in the reception of infrared rays coming from the emitter of infrared rays would indicate the presence of one or more persons in the vicinity of the extinguisher identifying device 480. In another variant, the presence detector 460 comprises a detector of infrared rays for detecting the infrared rays coming from one or more persons in the vicinity of the extinguisher identifying device. The appearance of these infrared rays would indicate the presence of one or more persons in the vicinity of the extinguisher identifying device 480.

The detector of the presence of at least one person 460 can be incorporated in the extinguisher identifying device 480 or can be a device separate from the extinguisher identifying device 480 and be associated with the extinguisher identifying device 480. In a particular embodiment the verification processor 340 or 440 can be configured so as to send a test signal to the central monitoring station 100 and to wait for a response signal coming from the central monitoring station 100 so as to verify the wireless connection 50. Failure to receive a response or receiving a response signal with low intensity may indicate a faulty wireless connection.

In another embodiment, the signaling means 350 can be configured so as to generate different signals depending on an operating fault of the extinguisher identifying device 380, 480. For example, the signaling means 350, 450 may comprise a first warning indicator dedicated to communications faults with the central monitoring station and a second warning indicator dedicated to power supply faults. Thus, the first warning indicator emitting a visible signal indicates a communications fault and the second warning indicator emitting a visible signal indicates a power supply fault.

In variants, a single indicator can be configured to emit different colors depending on the operating fault or to blink at different frequencies depending on the operating fault. In other variants, a sound signal can be emitted by the signaling means to warn of the operating fault. Different sounds can be emitted depending on the operating fault detected or the emission frequency of these sounds can vary depending on the operating fault or these sounds can be emitted in the form of impulses at repetition frequencies that depend on the operating fault.

Figure 8:
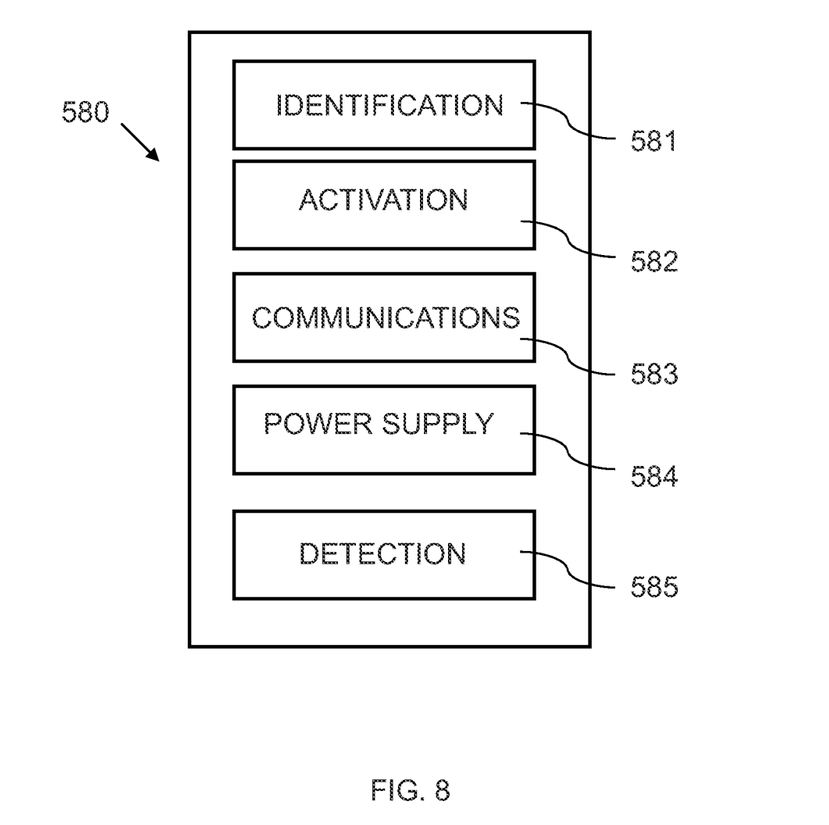
FIG. 8 is a schematic representation of an extinguisher identifying device according to a fourth embodiment of the invention.

An extinguisher identifying device 580 according to a fourth embodiment is represented schematically in FIG. 8. The extinguisher identifying device 580 comprises an extinguisher identifying module 581; a communications module 583 to link the extinguisher identifying device 580 to the central monitoring station 100 of the security system by means of a connection 50; an activation circuit 582 for activating the communications device 583 and/or the extinguisher identifying module 581, a power supply battery 584 and an extinguisher presence/absence detection module 585. The module for detecting the presence/absence of an extinguisher from its mount 585 can be realized in any known way. This can be, for example, by using an electrical contact, which is closed when the extinguisher is in its mount and open when the extinguisher is not in its mount. Of course, it is possible to have the electrical contact open when the extinguisher is in its mount and closed when not in it. This can also be by using any system utilizing a magnetic field. In that case, a magnet that creates a permanent magnetic field is fixed to the extinguisher and cooperates with a flexible plate switch (reed switch) or a Hall effect circuit fixed on the mount. Or again, this can be a system wherein electrodes fixed respectively on the extinguisher and on the mount cooperate to form a capacitor.

When the extinguisher presence/absence detection module 585 detects that the extinguisher is no longer present in its operating position, an extinguisher absence signal is sent to the central monitoring station 100 of the security system by the connection 50.

The activation circuit 582 can be configured so as to activate the communications module 583 when the extinguisher presence/absence detection module 585 detects the absence of an extinguisher from its operating position.

The activation circuit 582 can be able to activate the identifying module 581 when the extinguisher presence/absence detection module 585 detects the absence of an extinguisher from its operating position.

In a particular embodiment, the times for reading the extinguisher identifying code by the identifying module are preprogrammed and triggered in response to the detection by the extinguisher presence/absence detection module 585 of the removal of an extinguisher from its mount or of an extinguisher being placed back. Thus, the activation circuit 582 is able to activate the identifying module 581 at predefined times after the extinguisher presence/absence detection module 585 has detected the removal of an extinguisher from its mount and said extinguisher presence/absence detection module 585 has detected an extinguisher being placed back on its mount.

Figure 9:
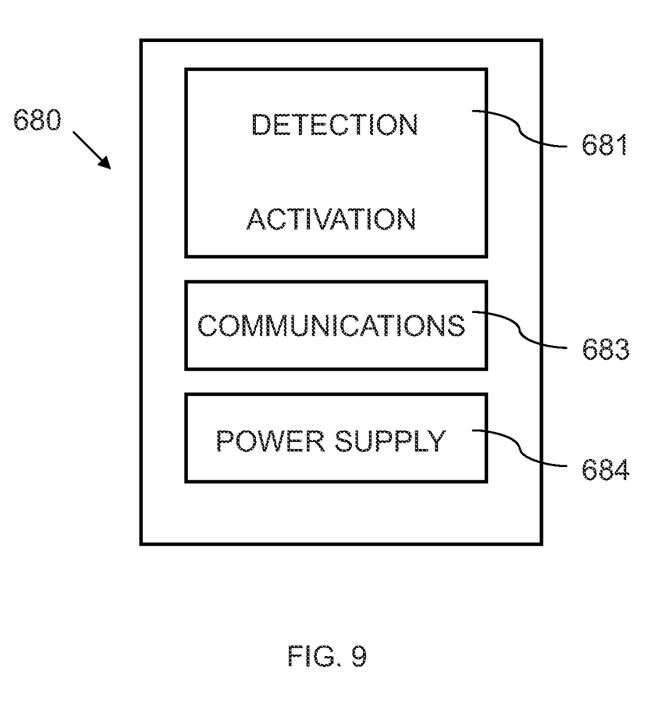
FIG. 9 is a schematic representation of a device for detecting the presence of an extinguisher according to a fifth embodiment of the invention.

An extinguisher presence detection device according to a fifth embodiment of the invention is represented schematically in FIG. 9. The extinguisher presence detection device 680 comprises an extinguisher presence/absence detection module 681; a communications module 683 to link the extinguisher identifying device 680 to the central monitoring station 100 of the security system by means of a connection 50; and a power supply battery 684 for powering the extinguisher presence detection device 680. Of course, if the connection is a powerline type of connection, the presence of the battery is not essential. In this embodiment the extinguisher presence detection module 681 is configured so as to activate the communications module 683 when an extinguisher is removed from its mount. To do this, the extinguisher presence/absence detection module 581 comprises an electrical contact, which is in an open position when the extinguisher is in its mount and closed when not in it.

In this way, when the extinguisher is no longer present in its operating position the communications module 683 is activated to automatically send an extinguisher absence signal to the central monitoring station 100 of the security system by the connection 50. Since the communications device is only activated when the extinguisher is absent, economies in the power supply of the extinguisher presence detection device 680 are realized.

In a particular embodiment, the extinguisher presence detection device 680 can also comprise an extinguisher identifying module as described for the fourth embodiment of the invention. Thus, the activation means of the extinguisher presence detection module 681 can be able to activate the identifying module after the extinguisher presence/absence detection module 681 has detected the removal of an extinguisher from its mount and said extinguisher presence/absence detection module 681 has detected an extinguisher being placed back on its mount. In a particular embodiment, the times for reading the extinguisher identifying code by the identifying module are preprogrammed and triggered in response to the detection of the removal of an extinguisher from its mount or of an extinguisher being placed back. Thus, the extinguisher absence detection module 681 is able to activate the extinguisher identifying module at predefined times after the extinguisher presence/absence detection module 681 has detected the removal of an extinguisher from its mount and said extinguisher presence/absence detection module 681 has detected an extinguisher being placed back on its mount.

It goes without saying, and is demonstrated moreover in the preceding description, that the invention is in no way restricted to those modes of application and embodiments that have been more particularly envisaged; on the contrary, it encompasses all the variants without in any way departing from the scope of the invention, such as it is defined by the claims; and in particular those wherein, when the connection 50 is a radio connection and the distances between certain extinguisher identifying devices and the central monitoring station are too great to ensure a good radio connection, intermediate beacons are used in a way known per se to centralize the data to be exchanged from or towards these extinguisher identifying devices.

The invention claimed is:

1. Extinguisher identifying device, comprising
an extinguisher reading device for receiving extinguisher identifying data from an identifying element on an extinguisher;
an activation device for activating the extinguisher reading device in response to a predetermined event;
a communication module for transmitting the extinguisher identifying data to a management device;
a detector for detecting an absence of the extinguisher from an extinguisher operating position on a mount; and
wherein the activation device is configured to activate the extinguisher reading device at predefined times after the detector has detected a removal of the extinguisher from the mount and the detector has detected a presence of the extinguisher back on the mount.

2. Device according to claim 1, wherein the mount comprises a mount identifying element to supply the extinguisher reading device with mount identifying data.

3. Device according to claim 1, wherein the extinguisher identifying device communicates with the identifying element of the extinguisher via a wireless connection to verify an identifying code for the extinguisher.

4. Device according to claim 1, wherein the extinguisher reading device comprises an optical reader and image processor for processing an image received from the optical reader.

5. Device according to claim 1, wherein the communication module are configured to transmit the identifying data by means of a wireless connection.

6. Device according to claim 1, further comprising a signaling device for signaling the absence of the extinguisher on the mount.

7. Device according to claim 6, further comprising a presence detector for detecting a presence of at least one person in a vicinity of the extinguisher identifying device, wherein the signaling device is configured to signal a visible or audible alarm when the presence of a person is detected.

8. Device according to claim 1, further comprising an operating condition verification device for checking an operating condition of the extinguisher identifying device so as to supply information representative of the operating condition to the management device.

9. Device according to claim 8, wherein the operating condition verification device is configured to verify a power source status of the extinguisher identifying device.

10. Device according to claim 8, wherein the operating condition verification device is configured to verify the condition of a wireless connection with the management device.

11. Device according to claim 8, wherein the operating condition verification device is configured to measure a parameter representative of a quantity of extinguishing agent remaining in the extinguisher.

12. A management device for a fire security system, comprising:
   a communication module configured to be linked via a wireless connection to at least one extinguisher identifying device according to claim 1 so as to receive extinguisher identifying data; and
   a data processor configured to obtain information about the extinguisher as a function of the extinguisher identifying data received.

13. Device according to claim 12, wherein the data processor is configured to obtain data identifying the extinguisher's mount and to verify that the data identifying the extinguisher's mount correspond to the extinguisher identifying data of the extinguisher.

14. An extinguishing device comprising:
   a tank for containing an extinguishing agent that can extinguish a fire;
   a trigger for expelling the extinguishing agent from the tank; and
   an identifying element, which can be read by an extinguisher identifying device according to claim 1, for identifying the extinguisher.

15. Device according to claim 14, wherein the identifying element is configured to communicate with the extinguisher reading device via a wireless connection to supply an identifying code for the extinguisher.

16. Device according to claim 14, wherein the identifying element comprises the identifying data in optical form.

17. Device according to claim 14, wherein the identifying element comprises the identifying data in electronic form.

18. A monitoring method for a security system comprising a management device and at least one extinguisher identifying device configured to communicate with the management device over a wireless connection; the method comprising the steps of:
   obtaining extinguisher identifying data of an extinguisher by an extinguisher reading device of said at least one extinguisher identifying device from an identifying element on the extinguisher;
   transmitting the extinguisher identifying data to the management device by a communication module of said at least one extinguisher identifying device;
   detecting an absence of the extinguisher from an extinguisher operating position on a mount by a detector of said at least one extinguisher identifying device; and
   activating the extinguisher reading device of said at least one extinguisher identifying device at predetermined times in response to detection of a removal of the extinguisher from the mount and in response to detection of a presence of the extinguisher back on the mount.

19. Method according to claim 18, further comprising the steps of obtaining a mount identifying data associated with a mount of the extinguisher and verifying that the extinguisher identifying data correspond to the mount identifying data.

20. Method according to claim 18, further comprising a step of transmitting information representative of an operating condition of the extinguisher identifying device to the management device.

* * * * *